US008112428B2

(12) United States Patent
van Leuken et al.

(10) Patent No.: US 8,112,428 B2
(45) Date of Patent: Feb. 7, 2012

(54) CLUSTERING IMAGE SEARCH RESULTS THROUGH VOTING: RECIPROCAL ELECTION

(75) Inventors: Reinier H. van Leuken, Utrecht (NL); Roelof van Zwol, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 544 days.

(21) Appl. No.: 12/277,248

(22) Filed: Nov. 24, 2008

(65) Prior Publication Data

US 2010/0131500 A1    May 27, 2010

(51) Int. Cl.
*G06F 17/30*    (2006.01)
(52) U.S. Cl. ....................................................... 707/748
(58) Field of Classification Search .................. 707/748, 707/749, 752, 753, 754
See application file for complete search history.

(56) References Cited

U.S. PATENT DOCUMENTS

| 6,240,424 | B1 | 5/2001 | Hirata |
| 7,260,263 | B1 * | 8/2007 | Jafarkhani et al. ............. 382/225 |
| 2003/0187836 | A1 * | 10/2003 | Ikeda ................................. 707/3 |
| 2004/0024758 | A1 * | 2/2004 | Iwasaki ............................. 707/3 |
| 2006/0200475 | A1 * | 9/2006 | Das et al. ...................... 707/100 |
| 2007/0271224 | A1 * | 11/2007 | Essafi et al. ....................... 707/3 |
| 2009/0313239 | A1 * | 12/2009 | Wen et al. .......................... 707/5 |
| 2010/0131499 | A1 | 5/2010 | van Leuken et al. |

OTHER PUBLICATIONS

Deng Cai, et al., "Hierarchical Clustering of WWW Image Search Results Using Visual, Textual and Link Information," International Multimedia Conference, Proceedings of the 12th annual ACM international conference on Multimedia, 2004, 8 pages.

Park et al., "Re-ranking Algorithm Using Post-retrieval Clustering for Content-Based Image Retrieval", Elsevier Science Ltd, 2003, 18 pages.

* cited by examiner

*Primary Examiner* — Angela Lie
*Assistant Examiner* — Fatima Mina
(74) *Attorney, Agent, or Firm* — Hickman Palermo Truong & Becker LLP (57) ABSTRACT

A search results page contains images that are organized based on the visual features of those images; images that have common visual features are grouped together using either a folding or a reciprocal election technique. Images that pertain to a particular meaning of a query term are less likely to be scattered across the page. A group of images that have common visual features is represented on the page by a single representative image from that group. Consequently, space for more representative images becomes available on the image search results page. Thus, search results page contains visually diverse representative images; space on the results page is not wasted by repeatedly showing the same image. The initial image search results page also therefore is more likely to contain representative images that otherwise would have occurred too far down a relevance-ranked list to be included within the initial search results page.

14 Claims, 6 Drawing Sheets

CLUSTERING IMAGE SEARCH RESULTS THROUGH VOTING: RECIPROCAL ELECTION

CROSS REFERENCE TO RELATED APPLICATIONS

This application is related to U.S. patent application Ser. No. 12/277,242, titled "CLUSTERING IMAGE SEARCH RESULTS THROUGH FOLDING," and filed on the same date herewith.

FIELD OF THE INVENTION

The present invention relates to techniques for generating a diverse set of representative image search results in response to a user's query.

BACKGROUND

Modern Internet search engines, such as the one provided by Yahoo! Inc., are capable of receiving query terms from remote users and searching a corpus of images—containing images which were automatically discovered from all over the Internet—for images that are relevant to those query terms. After finding one or more images that are relevant to the query terms submitted by a remote user, such an Internet search engine typically generates a search results page that contains thumbnails of the images that were determined to be most relevant to the query. The search results page also contains user-selectable hypertext links to other web pages that contain the full-size versions of the thumbnail images. Within the search results page, the thumbnail images may be placed in ranked order, with the images that were deemed to be most relevant to the query being placed closer to the top of the search results page than are the images that were deemed to be not as relevant to the query. The Internet search engine sends the search results page over the Internet to the remote user's Internet browser application (e.g., Mozilla Firefox, Microsoft Internet Explorer, Opera Software Opera, Apple Safari, etc.), which displays the search results page to the user.

Sometimes, the query terms that an Internet search engine receives from a remote user have multiple different meanings. Under such circumstances, the search results page may contain thumbnail images that relate to each of the different meanings. For example, if a user submits a query that contains the term "jaguar," then the search results page might contain some thumbnail images that show the jaguar species of animal, some thumbnail images that show Jaguar automobiles, and some thumbnail images that relate to a computer operating system called Jaguar. In actuality, the user might only be looking for thumbnail images that pertain to the first meaning-the species of animal. Unfortunately for the user, these thumbnail images are likely to be scattered in a purely chaotic manner among the other thumbnail images that pertain to the other meanings in which the user is not interested. This scattering of image results that pertain to a common meaning of a query term causes the user to expend additional time and energy sorting through the image results to locate the results in which the user is actually interested.

Other times, a user might actually not have in mind any specific meaning of the query terms that he submits to the Internet search engine; the user might be interested in seeing images that pertain to all of the different meanings of the submitted query terms. Under some circumstances, the relevance-ranked thumbnail images contained within the search results page will pertain dominantly, or even exclusively, to one particular meaning of the query terms. Although thumbnail images that pertain to other meanings of the search results might also be at least somewhat relevant, these thumbnail images might be underrepresented, or entirely left off of, at least the initial search results page because these thumbnail images were not deemed to be as relevant to the query terms as were the thumbnail images that pertain to the dominant meaning.

Even in situations where the user had a specific meaning in mind when he submitted the query terms, the most relevant image search results might come from different pages that all contain the same, or extremely similar, versions of an image. In these situations, the image search results page might appear to repeat the same thumbnail image over and over again. Typically, when a user is searching for images, the user will not be interested in the fact that the same image is present on many different web pages; the user would prefer to see different images represented within the image search results page. Users like to have options, but if an image search results page contains only a small selection of images, with each image repeated multiple times, then a user will naturally conclude that his options are limited (when, in actuality, his options might not be as limited as he thinks). The user is not likely to be satisfied when the image search results page lacks diversity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, the image search results page that an Internet search engine generates in response to a remote user's query contains thumbnail images that are deliberately organized based on the visual features of those images; images that have common visual features are grouped together. As a consequence of this organization, thumbnail images that pertain to a particular meaning of a query term are less likely to be scattered chaotically all over on the image search results page. A group of images that have common visual features can be represented on the image search results page by a single representative image from that group. Due to this grouping, the user has an easier time finding, within the image search results page, the thumbnail images that actually pertain to the user's intended meaning of the query terms.

As is mentioned above, a group of images can be represented on an image search results page by a single representative image from that group. As a result, space for more images, and for more representative images from different groups of images, becomes available on the image search results page. Thus, the Internet search engine can generate a search results page that contains visually diverse representative images; space on the results page is not wasted by repeatedly showing the same image (from different web pages) over and over again. The initial image search results page also therefore is more likely to contain representative images that otherwise would have occurred too far down a relevance-ranked list to be included within the initial image search results page. By using techniques described herein, the Internet search engine is able to present a user with a diverse set of images that are still relevant to that user's submitted query terms.

The techniques discussed below can be divided into two main types. One type of technique is the "folding" technique. The folding technique uses the relevance rankings of the original image search results in selecting the images groups to which images will be assigned, and in selecting which of the images in each group will be the representative image displayed for that group on the image search results page. Another type of technique is the "voting" technique. The voting technique does not use the relevance ranking of the original image search results in selecting the images groups to which images will be assigned, or in selecting which of the images in each group will be the representative image displayed for that group on the image search results page. The voting technique is designed to select representative images for image groups in an optimal manner, regardless of the relevance rankings of the images. Both the folding technique and the voting technique are described in greater detail below. First, however, a general technique for image clustering, of which both the folding technique and the voting technique are species, is discussed below.

Image Clustering Generally

Figure 1:
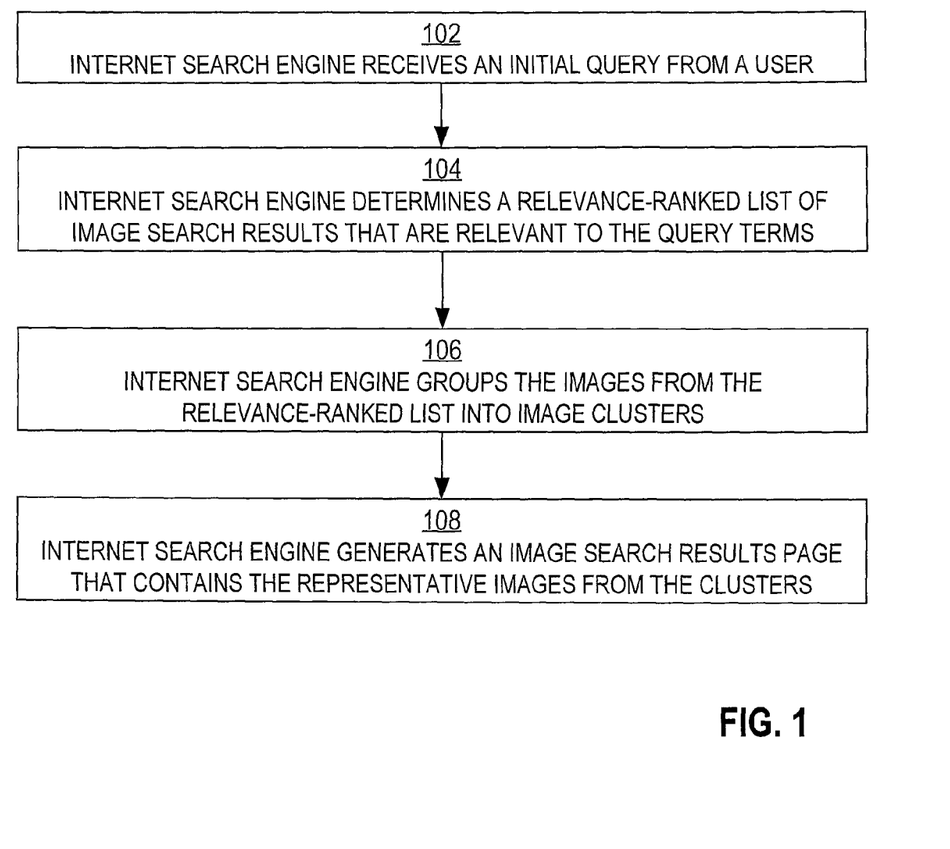
FIG. 1 is a flow diagram that illustrates a general overview of a technique for image clustering, according to an embodiment of the invention.

FIG. 1 is a flow diagram that illustrates a general overview of a technique for image clustering, according to an embodiment of the invention. Alternative embodiments of the invention may involve more, fewer, or different steps than those illustrated in FIG. 1. In block 102, an Internet search engine receives an initial search query from a user. In block 104, the Internet search engine determines a relevance-ranked list of image search results that are relevant to the query terms. In one embodiment of the invention, for each image in an image corpus, the Internet search engine determines the relevance of that image to the query terms at least in part by comparing each of the query terms to tags that have been associated with that image by various members of an Internet user community. In one embodiment of the invention, for each such image, the Internet search engine determines the relevance of that image to the query terms at least in part by comparing each of the query terms to a description that was given to that image by another user that uploaded that image to an image-sharing website on the Internet. Images that are associated with tags that match more of the query terms are deemed to be more relevant to the query terms than are images that are associated with tags that match few of the query terms. In the relevance-ranked list, the image deemed most relevant to the query terms is placed at the top or front of the list, with other relevant images following after in decreasing order of relevance. In block 106, the Internet search engine groups the images from the relevance-ranked list into image clusters, each image cluster having a representative image from that cluster. In block 108, the Internet search engine generates an image search results page that contains the representative images from the clusters, ordered based at least in part on relevance to the query terms.

Folding Clustering Technique

The folding technique operates on the assumption that images that are more highly relevance-ranked in the original image search results returned by the Internet search engine make better representative images for image clusters than do images that are less highly relevance-ranked in those results. The folding technique involves a traversal of a relevance-ranked list of images, starting with the image deemed to be the most relevant. During this traversal, traversed images are compared to already-selected representative images (if any) for clusters. A currently traversed image that is not sufficiently similar to any already-selected representative image is selected to be a new representative image for a new cluster. After all of the representative images have been selected in this manner, thereby forming "centers" for all of the clusters that will exist, each of the remaining non-representative images are placed (or "folded") into the cluster of the representative image to which that non-representative image is most similar.

Figure 2A:
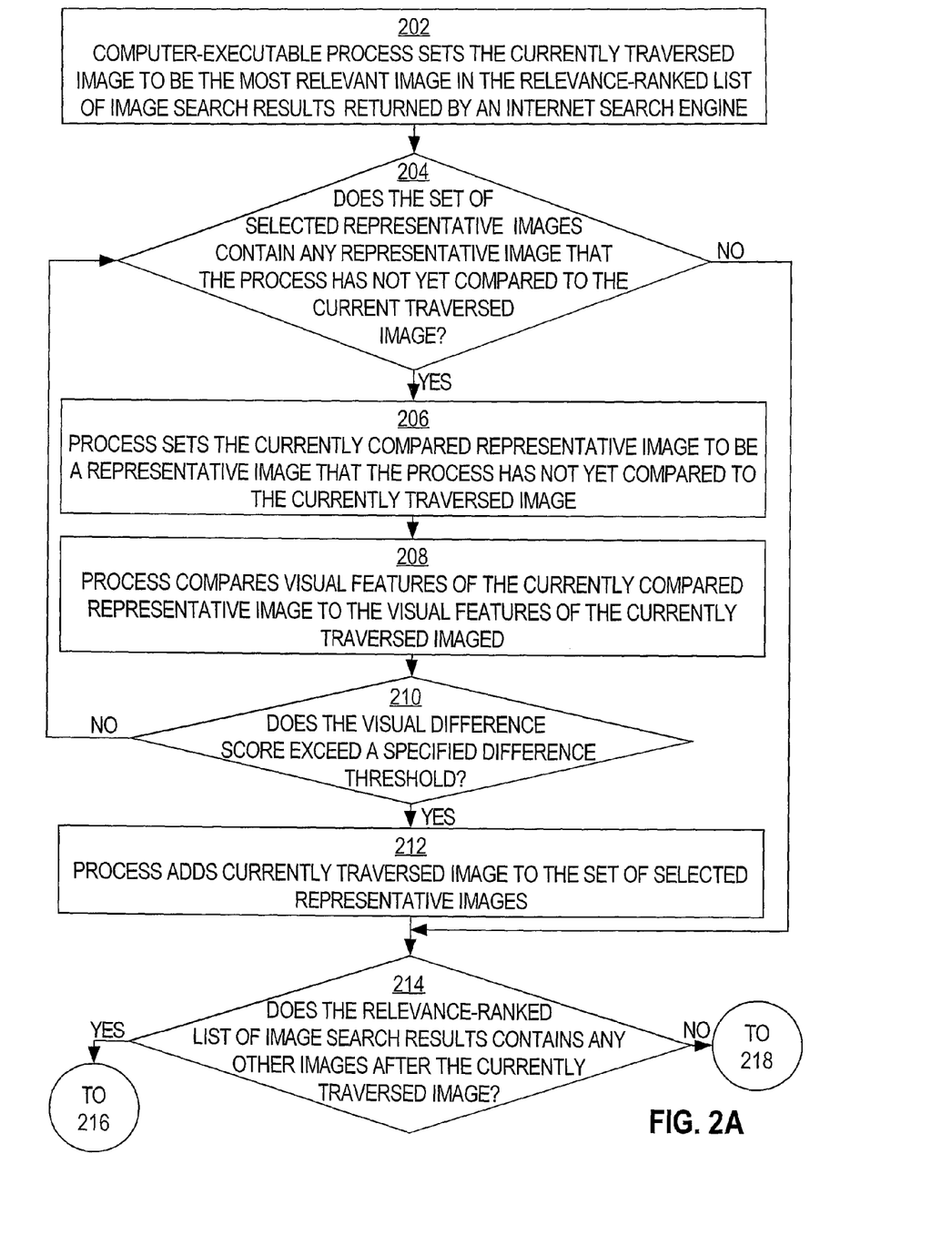
FIGS. 2A-B show a flow diagram that illustrates a more specific example of the folding technique for image clustering, according to an embodiment of the invention.
Figure 2B:
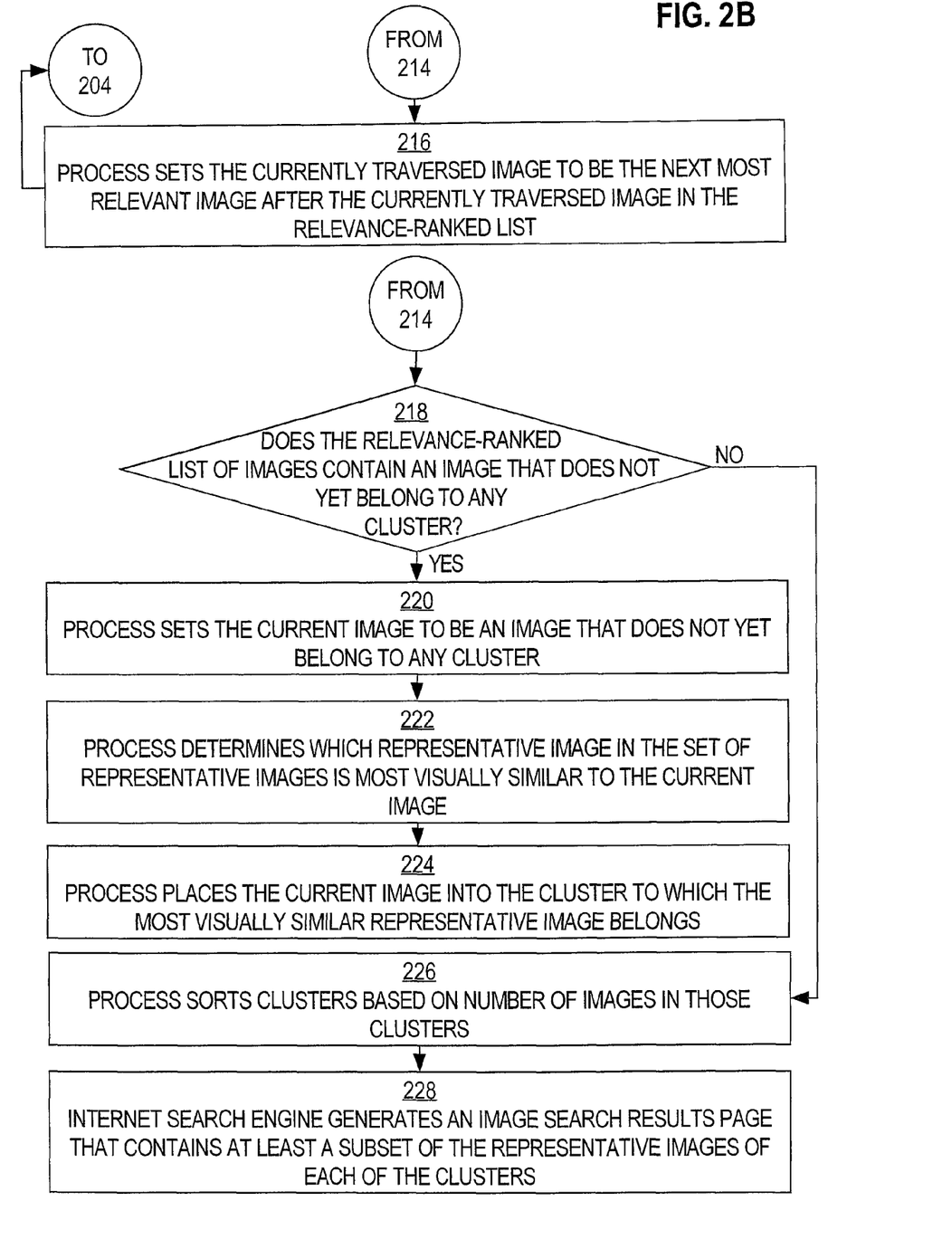

FIGS. 2A-B show a flow diagram that illustrates a more specific example of the folding technique for image clustering, according to an embodiment of the invention. Alternative embodiments of the invention may involve more, fewer, or different steps than those illustrated in FIGS. 2A-B. First, "centers" of each cluster are selected in the following manner. A cluster's "center" is the representative image selected to represent that cluster on the image search results page. In block 202, a computer-executable process sets the currently traversed image to be the most relevant image in the relevance-ranked list of image search results returned by an Internet search engine. In block 204, the process determines whether the set of selected representative images (which initially may be an empty set) contains any representative image that the process has not yet compared to the currently traversed image. If the set of selected images contains a representative image that the process has not yet compared to the currently traversed image, then control passes to block 206. Otherwise, control passes to block 214.

In block 206, the process sets the currently compared representative image to be a representative image that the process has not yet compared to the currently traversed image. In block 208, the process compares visual features of the currently compared representative image to the visual features of the currently traversed image in order to determine a visual difference score that reflects the lack of visual similarity between the currently compared representative image and the currently traversed image; the visual difference score increases as the visual similarity between the images decreases. Additional details about the visual features that may be compared are described in further detail below.

In block 210, the process determines whether the visual difference score exceeds a specified visual difference threshold. In one embodiment of the invention, the visual difference threshold is a static value, but in an alternative embodiment of the invention, the visual difference threshold varies from query to query. In one such alternative embodiment of the invention, the visual difference threshold is based on the variance of the feature values of all of the images in the relevance-ranked list. If the visual difference score exceeds the specified visual difference threshold, then control passes to block 212. Otherwise, control passes back to block 204.

In block 212, the process adds the currently traversed image to the set of selected representative images. The process makes the currently traversed image the representative image for a new image cluster that currently contains only the currently traversed image. Control passes to block 214.

In block 214, the process determines whether the relevance-ranked list of image search results contains any other images after the currently traversed image. If the relevance-ranked list contains another image after the currently traversed image, then control passes to block 216. Otherwise, control passes to block 218.

In block 216, the process sets the currently traversed image to be the next most relevant image after the currently traversed image in the relevance-ranked list, thereby traversing the relevance-ranked list. Control passes back to block 204.

After the cluster centers have been selected as described above, the clusters are formed by "folding" the remaining images into the clusters in the following manner. In block 218, the process determines whether the relevance-ranked list of images contains any images that do not yet belong to any clusters. If the relevance-ranked list of images contains an image that does not yet belong to any cluster, then control passes to block 220. Otherwise, control passes to block 226.

In block 220, the process sets the current image to be an image that does not yet belong to any cluster. In block 222, the process determines which representative image in the set of representative images is most visually similar to the current image. In determining which representative image is most visually similar to the current image, the process compares visual features of each representative image to the visual features of the current image in order to determine, for each representative image, a visual similarity score that reflects the visual similarity between that representative image and the current image; the visual similarity score increases as the visual similarity between the images increases. As is mentioned above, additional details about the visual features that may be compared are described in further detail below. The process then determines the representative image with the highest visual similarity score to be the representative image that is most visually similar to the current image. In block 224, the process places (or "folds") the current image into the cluster to which the most visually similar representative image belongs. Control then passes back to block 218.

In some embodiments of the invention, the operation of block 226 is not performed; the operation of block 226 is optional. In block 226, the process sorts the clusters based on the number of images in those clusters, so that the clusters with a greater number of images come before the clusters with fewer images in the cluster ordering. The number of images in a cluster is that cluster's "cardinality." Normally, if the operation of block 226 is not performed, then the ordering of the clusters will be based on the relevance rankings of the representative images of those clusters, such that clusters whose representative images are highly relevance-ranked precede, in the cluster ordering, clusters whose representative images are less highly relevance-ranked. Control passes to block 228.

In block 228, the Internet search engine generates an image search results page that contains at least a subset of the representative images of each of the clusters. In one embodiment of the invention, relevant images other than the representative images are not initially placed in the image search results page; these non-representative images are at least initially concealed from the user's view. In one embodiment of the invention, the representative images are organized on the image search results page based on the cluster ordering described above. After generating the image search results page in the manner described above, the Internet search engine returns the image search results page to the user's computer as a response to the user's query. Upon receiving the image search results page, the user's Internet browser application displays the image search results page to the user.

Voting Clustering Technique

Unlike the folding technique discussed above, the voting technique does not select all of the representative images for all of the image clusters prior to assigning any of the non-representative images to any of the image clusters. Instead, the voting technique selects a single representative image from the search results and then assigns, to a new cluster to which that representative image belongs, those of the remaining non-representative images that (a) have not yet been assigned to any cluster and (b) are sufficiently similar, visually, to that representative. The voting technique repeats this representative image selection and cluster formation process until the image search results do not contain any more non-representative images that have not yet been assigned to any cluster. Furthermore, unlike the folding technique discussed above, the voting technique does not need to be based in any way on a relevance order-based traversal of the image search results.

The voting technique is performed by re-ranking of a subset of the image search results (e.g., the "K" most relevant image search results returned in response to the user's query, where "K" is some number) for each image in that subset. As a result, a different re-ranked list of the images in the subset is produced for each image in the subset. For example, if there are 50 images in the subset, then 50 different re-ranked lists are generated-one for each image in the subset. For each particular image in the subset, the other images in the particular image's list are ranked based on the visual similarity of those other images to that particular image. Then, each of the other images in the particular image's list is given a voting score that is based on that other image's rank in the list. Images that are highly ranked in a list are given a higher score, in that list, than images that are not as highly ranked in that list.

Thus each image in the subset of image search results may receive a different voting score for each re-ranked list in which that image occurs. After each of the images has been assigned a voting score in each re-ranked list in which that image occurs, a total voting score for that image is calculated by adding up all of the voting scores that the image received.

The image with the highest total voting score among the total voting scores of all of the subset's images that have not yet been assigned to any cluster (initially, all of the subset's images) is selected to be a representative image for a new image cluster (and is assigned to that new image cluster). Next, the re-ranked lists of all of the other images that have not yet been assigned to any cluster are consulted to determine how highly that representative image ranked in those other image's re-ranked lists. For each not-yet-clustered image in whose re-ranked list the representative image is in the top "M" (where "M" is some specified number) positions of the images in that re-ranked list, that not-yet-clustered image is assigned to the representative image's cluster. For example, if "M" is 4, then each not-yet-clustered image in whose re-ranked list the representative image is in the top 4 positions is placed in the representative image's cluster. This process of creating new clusters and assigning images to those clusters is repeated until all of the images in the subset of image search results have been assigned to a cluster.

Figure 3A:
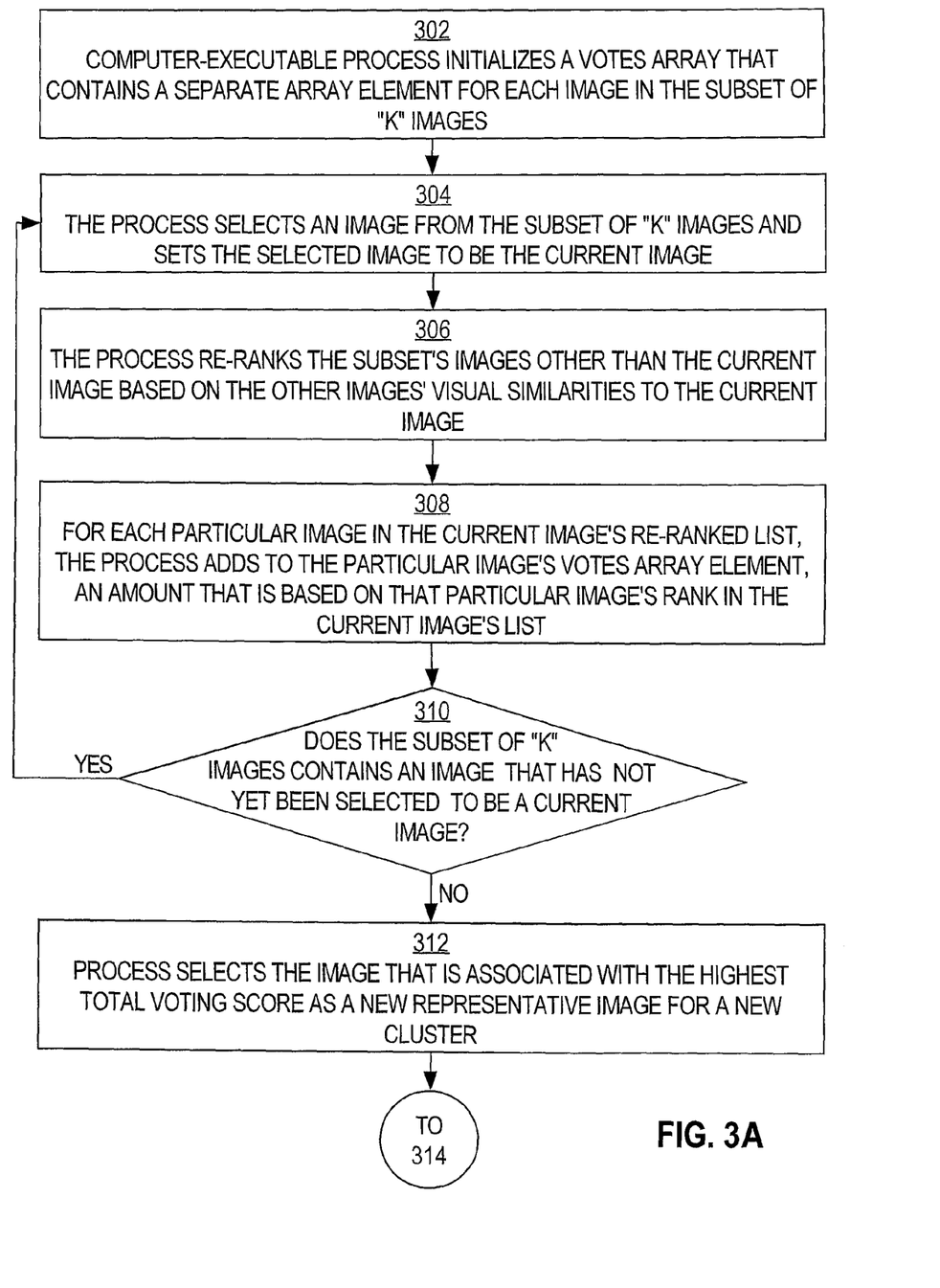
FIGS. 3A-B show a flow diagram that illustrates a more specific example of the voting technique for image clustering, according to an embodiment of the invention.
Figure 3B:
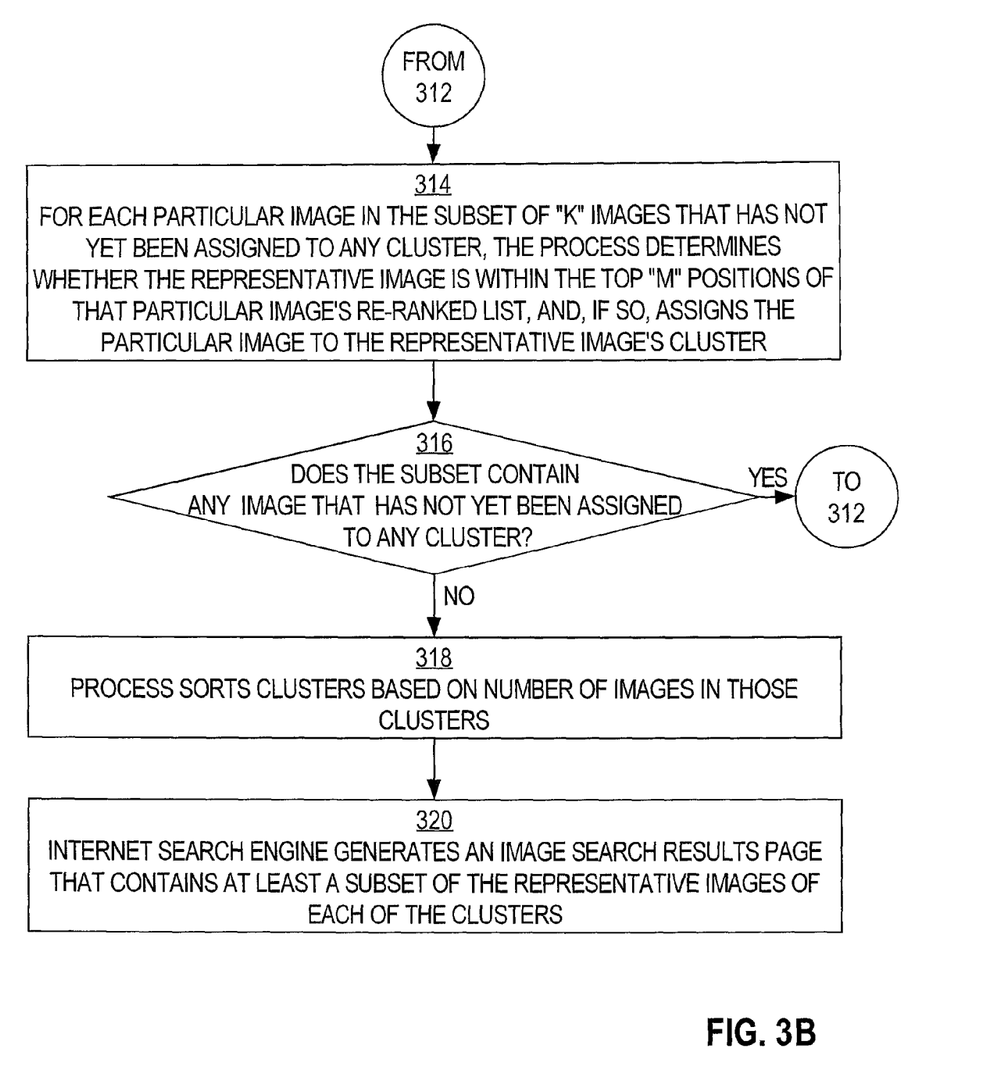

FIGS. 3A-B show a flow diagram that illustrates a more specific example of the voting technique for image clustering, according to an embodiment of the invention. Alternative embodiments of the invention may involve more, fewer, or different steps than those illustrated in FIGS. 3A-B. First, the voting phase occurs. In block 302, a computer-executable process initializes a votes array that contains a separate array element for each image in the subset of "K" images; the process sets the value of each array element to zero. Each such array element will contain a running total voting score for a different image in the subset of "K" images.

In block 304, the process selects an image (perhaps arbitrarily) from the subset of "K" images and sets the selected image to be the current image. In block 306, the process re-ranks the subset's images other than the current image based on those other images' visual similarities to the current image. In ranking the other images, the process compares visual features of each of the other images to the visual feature of the current image. Images that are more visually similar to the current image are ranked higher than images that are less visually similar to the current image. As is mentioned above, additional details about the visual features that may be compared are described in further detail below. The current image's re-ranked list is stored for later use.

In block 308, for each particular image in the current image's re-ranked list, the process adds, to the running total voting score value that is in that particular image's votes array element, an amount that is based on that particular image's rank in the current image's list. In one embodiment of the invention, the process adds, to the running total voting score value that is in that particular image's votes array element, an amount that is equal to one divided by the particular image's position in the current image's list.

In block 310, the process determines whether the subset of "K" images contains any images that have not yet been selected to be a current image, as discussed above relative to block 304. If the subset of "K" images contains an image that has not yet been selected to be a current image, then control passes to block 304. Otherwise, control passes to block 312.

In block 312, the process selects the image that is associated with the highest total voting score (as reflected by the value in that image's votes array element) as a new representative image for a new cluster. The process creates the new cluster and assigns the representative image to the new cluster. In block 314, for each particular image in the subset of "K" images that has not yet been assigned to any cluster, the process determines whether the representative image is within the top "M" positions of that particular image's re-ranked list (previously stored, as discussed above). If the representative image is within the top "M" positions of that particular image's re-ranked list, then the process assigns the particular image to the representative image's cluster.

In block 316, the process determines whether the subset of "K" images contains any images that have not yet been assigned to any cluster. If the subset contains any image that has not yet been assigned to any cluster, then control passes back to block 312. Otherwise, control passes to block 318.

In some embodiments of the invention, the operation of block 318 is not performed; the operation of block 318 is optional. In block 318, the process sorts the clusters based on the number of images in those clusters, so that the clusters with a greater number of images come before the clusters with fewer images in the cluster ordering. The number of images in a cluster is that cluster's "cardinality." Normally, if the operation of block 318 is not performed, then the ordering of the clusters will be based on the total voting scores of the representative images of those clusters. Control passes to block 320.

In block 320, the Internet search engine generates an image search results page that contains at least a subset of the representative images of each of the clusters. In one embodiment of the invention, relevant images other than the representative images are not initially placed in the image search results page; these non-representative images are at least initially concealed from the user's view. In one embodiment of the invention, the representative images are organized on the image search results page based on the cluster ordering described above. After generating the image search results page in the manner described above, the Internet search engine returns the image search results page to the user's computer as a response to the user's query. Upon receiving the image search results page, the user's Internet browser application displays the image search results page to the user.

Exapanding and Collapsing Image Clusters

In one embodiment of the invention, regardless of the cluster-generation technique employed, the image search results page contains, for each representative image therein, a corresponding user interface control that can be activated by the user in order to cause the image search results page to "expand" the corresponding representative image's cluster, thereby revealing all of the non-representative images that are within that cluster. In such an embodiment of the invention, subsequent activation of the same control causes the image search results page to "collapse" the corresponding representative image's cluster, thereby concealing, once again, the non-representative images that are within that cluster. In one embodiment of the invention, clusters are alternately expanded and collapsed in this manner in response to a user mouse-clicking on the clusters' corresponding representative images themselves.

Comparing Visual Features

The techniques discussed above involve comparisons of visual features of representative images to other images in order to determine the extent of the visual similarities or differences between those images. In one embodiment of the invention, the following visual features are used to compare the visual similarities or differences between two images: color layout, color histogram, edge histogram, scalable color, color and edge directivity descriptor (CEDD), and Tamura features. These features are standardized by the MPEG-7 Consortium. Although all of these visual features are used to compare the images in one embodiment of the invention, alternative embodiments of the invention may also compare features that are additional to those discussed herein. Additionally, alternative embodiments of the invention may omit one or more of these features as a basis of comparison. Virtually any visual features of an image could be used to determine that image's visual similarity to, or visual difference from, another image.

The color layout feature generally reflects where, in an image, red colors occur. The color layout feature is described in the publication "Image Indexing Using Color Correlograms," by Jing Huang, S. Ravi Kumar, Mandar Mitra, Wei-Jing Zhu, and Ramin Zabih (1997), which publication is incorporated by reference as though fully disclosed herein. The color histogram feature generally reflects whether an image contains more blue than yellow colors, or vice-versa. The edge histogram feature generally reflects what kinds of shapes are contained in an image. The color histogram, edge histogram, and scalable color features are described in the publication "Color and Texture Descriptors," *IEEE Transactions on Circuits and Systems for Video Technology*, vol. 11, no. 6, by B. S. Manjunath, Jens-Rainer Ohm, Vinod V. Vasudevan, and Akio Yamada (2001), which publication is incorporated by reference as though fully disclosed herein. The CEDD feature is described in the publication "CEDD: Color and Edge Directivity Descriptor: A Compact Descriptor for Image Indexing and Retrieval," by Savvas A. Chatzichristophus and Yiannis S. Boutalis (2008), which publication is incorporated by reference as though fully disclosed herein. The Tamura features are described in the publication "Textual Features Corresponding to Visual Perception," *IEEE Transactions on Systems, Man, and Cybernetics*, vol. SMC-8, no. 6, by Hideyuki Tamura, Shunji Mori, and Takashi Yamawaki (1978), which publication is incorporated by reference as though fully disclosed herein. More specifically, one embodiment of the invention compares images based at least in part on those images' coarseness, contrast, and directionality features, all of which are included within the Tamura features.

Hardware Overview

Figure 4:
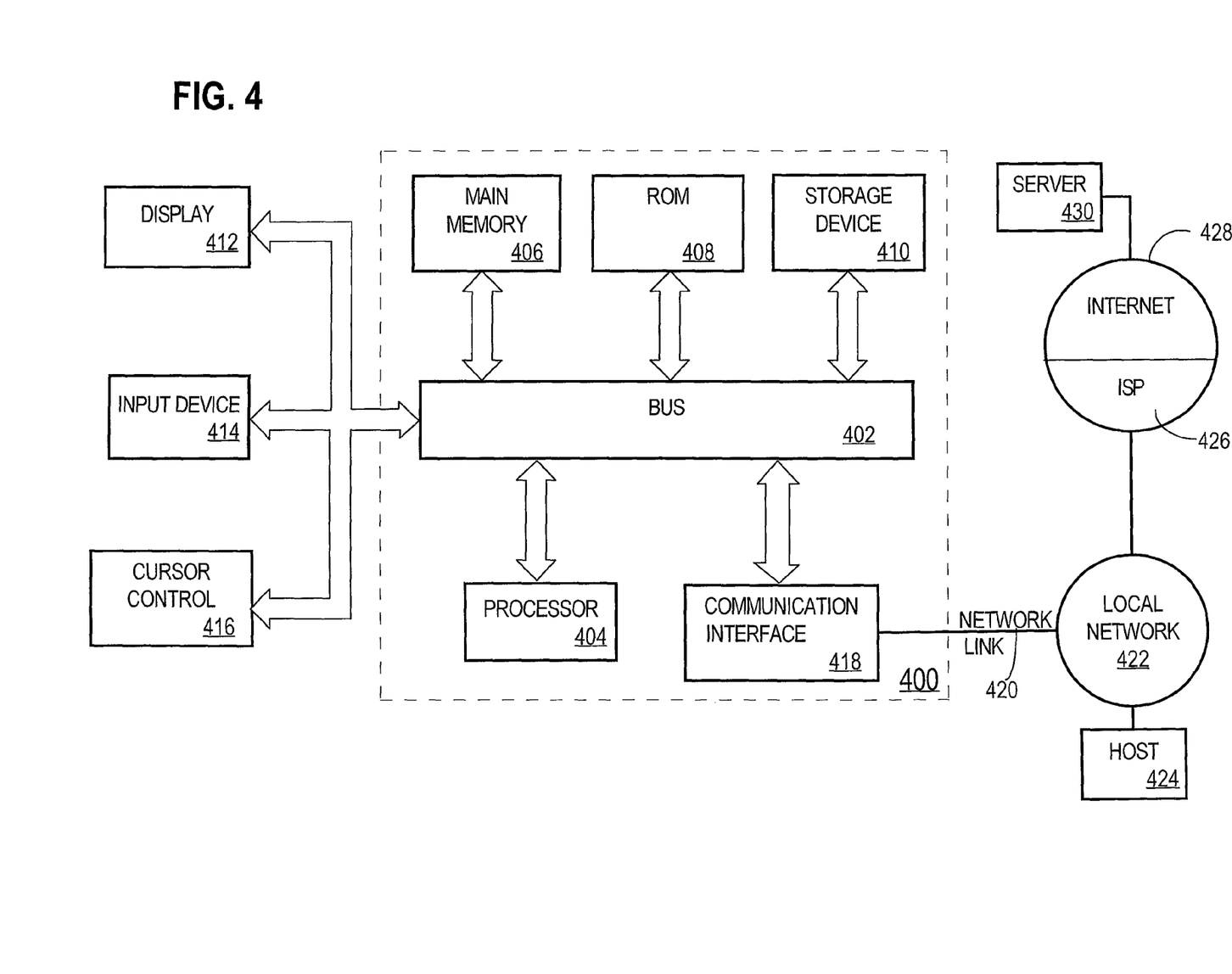
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    for each particular image in a set of images, generating a separate ranked list of other images in the set of images by ranking each of the other images based at least in part on visual similarity of each of the other images to the particular image, thereby generating a plurality of ranked lists that includes a separate ranked list for each image in the set of images;
    for each particular ranked list in the plurality of ranked lists, giving each other image than the particular image for which the particular ranked list was generated a voting score that is based at least in part on said other image's rank in the particular ranked list;
    for at least one image in the set of images, generating a total voting score for the at least one image at least in part by adding up voting scores given to the at least one image in each ranked list of the plurality of ranked lists;
    selecting said at least one image from the set of images to be a particular representative image based at least in part on the total voting score generating for said at least one image;
    generating a document that contains said particular representative image; and
    storing the document on a volatile or non-volatile computer-readable storage medium;
    wherein the particular representative image is a first representative image further comprising:
        after selecting said at least one image to be the first representative image and assigning the first representative image to a first image cluster, determining a first set of non-representative images in whose ranked lists of the plurality of ranked lists the first representative image occurs within a specified to portion of those non-representative image's ranked lists; and
        assigning images in the first set of non-representative images to a first image cluster that contains the first representative image.

2. The method of claim 1, wherein the step of generating the document comprises:
    organizing two or more representative images, including said particular representative image, in the document based at least in part on numbers of images that are contained in image clusters to which the representative images belong.

3. The method of claim 1, further comprising:
    receiving a query from a user; and
    sending the document over a network in response to the query.

4. The method of claim 1,
    wherein the document does not contain any images in the first set of non-representative images.

5. The method of claim 1, further comprising:
    after selecting a second representative image from images that were not assigned to the first image cluster and assigning the second representative image to a second image cluster, determining a second set of particular non-representative images (a) that were not assigned to the first image cluster and (b) in whose ranked lists of the plurality of ranked lists the second representative image occurs within the specified top portion of those particular non-representative image's ranked lists; and
    assigning images in the second set of non-representative images to the second image cluster;
    wherein the document does not contain any images in the first set of non-representative images;
    wherein the document does not contain any images in the second set of non-representative images.

6. The method of claim 1, wherein the particular representative image is a first representative image, and further comprising:
    selecting, as the first representative image, an image that is associated with a highest total voting score among total voting scores that are associated with the images in the set of images;
    creating a new first image cluster;
    assigning the first representative image to the first image cluster as a representative image for other images that will be in the first image cluster;
    after assigning the first representative image to the first image cluster, determining a first set of non-representative images in whose ranked lists of the plurality of ranked lists the first representative image occurs within a specified top portion of those non-representative image's ranked lists; and
    assigning images in the first set of non-representative images to the first image cluster;
    selecting, as a second representative image, an image that is associated with a highest total voting score among total voting scores that are associated with images that are (a) in the set of images but (b) not assigned to the first image cluster;

creating a new second image cluster;

assigning the second representative image to the second image cluster as a representative image for other images that will be in the second image cluster;

after assigning the second representative image to the second image cluster, determining a second set of particular non-representative images (a) that were not assigned to the first image cluster and (b) in whose ranked lists of the plurality of ranked lists the second representative image occurs within the specified top portion of those particular non-representative image's ranked lists; and assigning images in the second set of non-representative images to the second image cluster;

wherein the document does not contain any images in the first set of non-representative images;

wherein the document does not contain any images in the second set of non-representative images.

7. The method of claim 1, wherein the step of generating, for each particular image in the set of images, a separate ranked list of other images in the set of images by ranking each of the other images based at least in part on visual similarity of each of the other images to the particular image is based at least in part on (a) a comparison of color layouts of at least two images, (b) a comparison of color histogram of at least two images, (c) a comparison of edge histograms of at least two images, (d) a comparison of scalable colors of at least two images, (e) a comparison of color and edge directivity descriptors (CEDDs) of at least two images, and (f) a comparison of one or more Tamura features of an image to one or more Tamura features of another image.

8. A non-transitory computer-readable storage medium storing one or more instructions which, when executed by one or more processors, cause the one or more processors to perform steps comprising:

for each particular image in a set of images, generating a separate ranked list of other images in the set of images by ranking each of the other images based at least in part on visual similarity of each of the other images to the particular image, thereby generating a plurality of ranked lists that includes a separate ranked list for each image in the set of images;

for each particular ranked list in the plurality of ranked lists, giving each other image than the particular image for which the particular ranked list was generated a voting score that is based at least in part on said other image's rank in the particular ranked list;

for at least one image in the set of images, generating a total voting score for the at least one image at least in part by adding up voting scores given to the at least one image in each ranked list of the plurality of ranked lists;

selecting said at least one image from the set of images to be a particular representative image based at least in part on the total voting score generating for said at least one image;

generating a document that contains said particular representative image; and storing the document on a volatile or non-volatile computer-readable storage medium;

wherein the particular representative image is a first representative image, and further comprising:

after selecting said at least one image to be the first representative image and assigning the first representative image to a first image cluster, determining a first set of non-representative images in whose ranked lists of the plurality of ranked lists the first representative image occurs within a specified to portion of those non-representative image's ranked lists; and assigning images in the first set of non-representative images to a first image cluster that contains the first representative image.

9. The non-transitory computer-readable medium of claim 8, wherein the step of generating the document comprises:

organizing two or more representative images, including said particular representative image, in the document based at least in part on numbers of images that are contained in image clusters to which the representative images belong.

10. The non-transitory computer-readable medium of claim 8, further comprising:

receiving a query from a user; and sending the document over a network in response to the query.

11. The non-transitory computer-readable medium of claim 8, wherein the document does not contain any images in the first set of non-representative images.

12. The non-transitory computer-readable medium of claim 8, wherein the steps further comprise:

after selecting a second representative image from images that were not assigned to the first image cluster and assigning the second representative image to a second image cluster, determining a second set of particular non-representative images (a) that were not assigned to the first image cluster and (b) in whose ranked lists of the plurality of ranked lists the second representative image occurs within the specified top portion of those particular non-representative image's ranked lists; and assigning images in the second set of non-representative images to the second image cluster;

wherein the document does not contain any images in the first set of non-representative images;

wherein the document does not contain any images in the second set of non-representative images.

13. The non-transitory computer-readable medium of claim 8, wherein the particular representative image is a first representative image, and wherein the steps further comprise:

selecting, as the first representative image, an image that is associated with a highest total voting score among total voting scores that are associated with the images in the set of images;

creating a new first image cluster;

assigning the first representative image to the first image cluster as a representative image for other images that will be in the first image cluster;

after assigning the first representative image to the first image cluster, determining a first set of non-representative images in whose ranked lists of the plurality of ranked lists the first representative image occurs within a specified top portion of those non-representative image's ranked lists; and assigning images in the first set of non-representative images to the first image cluster;

selecting, as a second representative image, an image that is associated with a highest total voting score among total voting scores that are associated with images that are (a) in the set of images but (b) not assigned to the first image cluster;

creating a new second image cluster;

assigning the second representative image to the second image cluster as a representative image for other images that will be in the second image cluster;

after assigning the second representative image to the second image cluster, determining a second set of particular non-representative images (a) that were not assigned to the first image cluster and (b) in whose ranked lists of the plurality of ranked lists the second representative image occurs within the specified top portion of those particular non-representative image's ranked lists; and assigning images in the second set of non-representative images to the second image cluster;

wherein the document does not contain any images in the first set of non-representative images;

wherein the document does not contain any images in the second set of non-representative images.

14. The non-transitory computer-readable medium of claim 8, wherein the step of generating, for each particular image in the set of images, a separate ranked list of other images in the set of images by ranking each of the other images based at least in part on visual similarity of each of the other images to the particular image is based at least in part on (a) a comparison of color layouts of at least two images, (b) a comparison of color histogram of at least two images, (c) a comparison of edge histograms of at least two images, (d) a comparison of scalable colors of at least two images, (e) a comparison of color and edge directivity descriptors (CEDDs) of at least two images, and (f) a comparison of one or more Tamura features of an image to one or more Tamura features of another image.

* * * * *